United States Patent
Dragone et al.

(10) Patent No.: US 10,097,355 B2
(45) Date of Patent: Oct. 9, 2018

(54) TAMPER RESISTANCE OF DISTRIBUTED HARDWARE SYSTEMS

(71) Applicant: International Business Machines Corporation, Armonk, NY (US)

(72) Inventors: Silvio Dragone, Winterthur (CH); Michael C. Osborne, Richterswil (CH); Tamas Visegrady, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 236 days.

(21) Appl. No.: 15/089,935

(22) Filed: Apr. 4, 2016

(65) Prior Publication Data

US 2017/0288876 A1    Oct. 5, 2017

(51) Int. Cl.
*H04L 29/06* (2006.01)
*H04L 9/32* (2006.01)
*G06F 21/70* (2013.01)
*G06F 21/44* (2013.01)

(52) U.S. Cl.
CPC ............ *H04L 9/3247* (2013.01); *G06F 21/44* (2013.01); *G06F 21/70* (2013.01); *H04L 63/0853* (2013.01)

(58) Field of Classification Search
CPC ................................. G06F 21/44; G06F 21/70
See application file for complete search history.

(56) References Cited

U.S. PATENT DOCUMENTS

| 7,587,607 B2* | 9/2009 | Brickell ............... G06F 21/57 380/255 |
| 2004/0117660 A1* | 6/2004 | Karaoguz ............. H04L 63/08 726/5 |
| 2009/0178138 A1* | 7/2009 | Weiss .................. G06F 21/577 726/22 |
| 2011/0246756 A1* | 10/2011 | Smith .................. H04L 9/3252 713/2 |
| 2017/0024570 A1* | 1/2017 | Pappachan ............ G06F 13/28 |
| 2017/0230245 A1* | 8/2017 | Jacquin ............... H04L 41/0866 |
| 2017/0346640 A1* | 11/2017 | Smith .................... H04L 9/14 |

* cited by examiner

Primary Examiner — Thaddeus J Plecha
(74) Attorney, Agent, or Firm — Cantor Colburn LLP; Daniel Morris

(57) ABSTRACT

Embodiments are directed to an IC device comprising a set of N elements, and an interconnect system for enabling communication between the set of elements. Each element of the set of elements is configured according to a first communication plan to receive attestation data of each other element of the set of elements. Upon receiving the attestation data the element may determine whether each of the received attestation data from the other elements match an attestation pattern as defined in the first communication plan. In case the received attestation data match the first communication plan, the element may determine whether the received attestation data is attested by N-1 elements of the set of elements. In case the attestation data is attested by N-1 elements of the set of elements, the element may indicate the presence of the set of elements before the time interval has lapsed.

12 Claims, 4 Drawing Sheets

TAMPER RESISTANCE OF DISTRIBUTED HARDWARE SYSTEMS

BACKGROUND

One or more embodiments of the present invention relate to the field of digital computer systems, and more specifically, to a method for securing operation of an integrated circuit (IC) device.

Specific hardware designs are required to create trust in a computing system where it is important to maintain the confidentiality and integrity of the information; in particular, when the information is digitally signed.

Cryptographic accelerators are becoming more prevalent on processors and multi-chip platforms. They offer digital signature/sign capabilities. Thousands of signatures per second are achievable on current hardware engines. Such systems require a steady background traffic consisting of such signatures. However this requirement is negligible in terms of capacity. The signing traffic requires human-scale latencies between devices which are many orders of magnitude below that of local interconnect latencies.

SUMMARY

One or more embodiments provide methods for securing operation of an IC device, computer system and IC device as described by the subject matter of the independent claims. Embodiments are described in the dependent claims. Embodiments of the present invention can be freely combined with each other if they are not mutually exclusive.

In one or more embodiments, the invention relates to methods for secure operation of an IC device having a set of N elements. In one or more embodiments, the method comprises: providing an interconnect system for enabling communication between the set of elements; defining a first communication plan for pairwise communication of attestation data between all the set of elements through the interconnect system within a predefined time interval; configuring in accordance with the first communication plan each element of the set of elements, the configuring for a given element of the set of elements comprising at the given element: receiving attestation data of each other element of the set of elements; determining whether each of the received attestation data from the other elements match an attestation pattern as defined in the first communication plan; in case the received attestation data match the first communication plan; determining whether the received attestation data is attested by N−1 elements of the set of elements; in case the attestation data is attested by N−1 elements of the set of elements, indicating the presence of the set of elements before the time interval has lapsed, otherwise combining the received attestation data with data attested by the given element and sending the combined data as the attestation data to a further element of the set of elements.

In another aspect, the invention relates to an IC device, or to a computer system that includes the IC device, the IC device comprising a set of N elements, and an interconnect system for enabling communication between the set of elements, wherein each element of the set of elements is configured in accordance with a first communication plan to: receive attestation data of each other element of the set of elements; determine whether each of the received attestation data from the other elements match an attestation pattern as defined in the first communication plan; in case the received attestation data match the first communication plan determine whether the received attestation data is attested by N−1 elements of the set of elements; In case the attestation data is attested by N−1 elements of the set of elements, indicate the presence of the set of elements before the time interval has lapsed, otherwise combine the received attestation data with data attested by the given element and sending the combined data as the attestation data to a further element of the set of elements.

BRIEF DESCRIPTION OF THE DRAWINGS

In the following detailed description, embodiments of the invention are explained in greater detail, by way of example only, making reference to the drawings in which.

DETAILED DESCRIPTION

Figure 1:
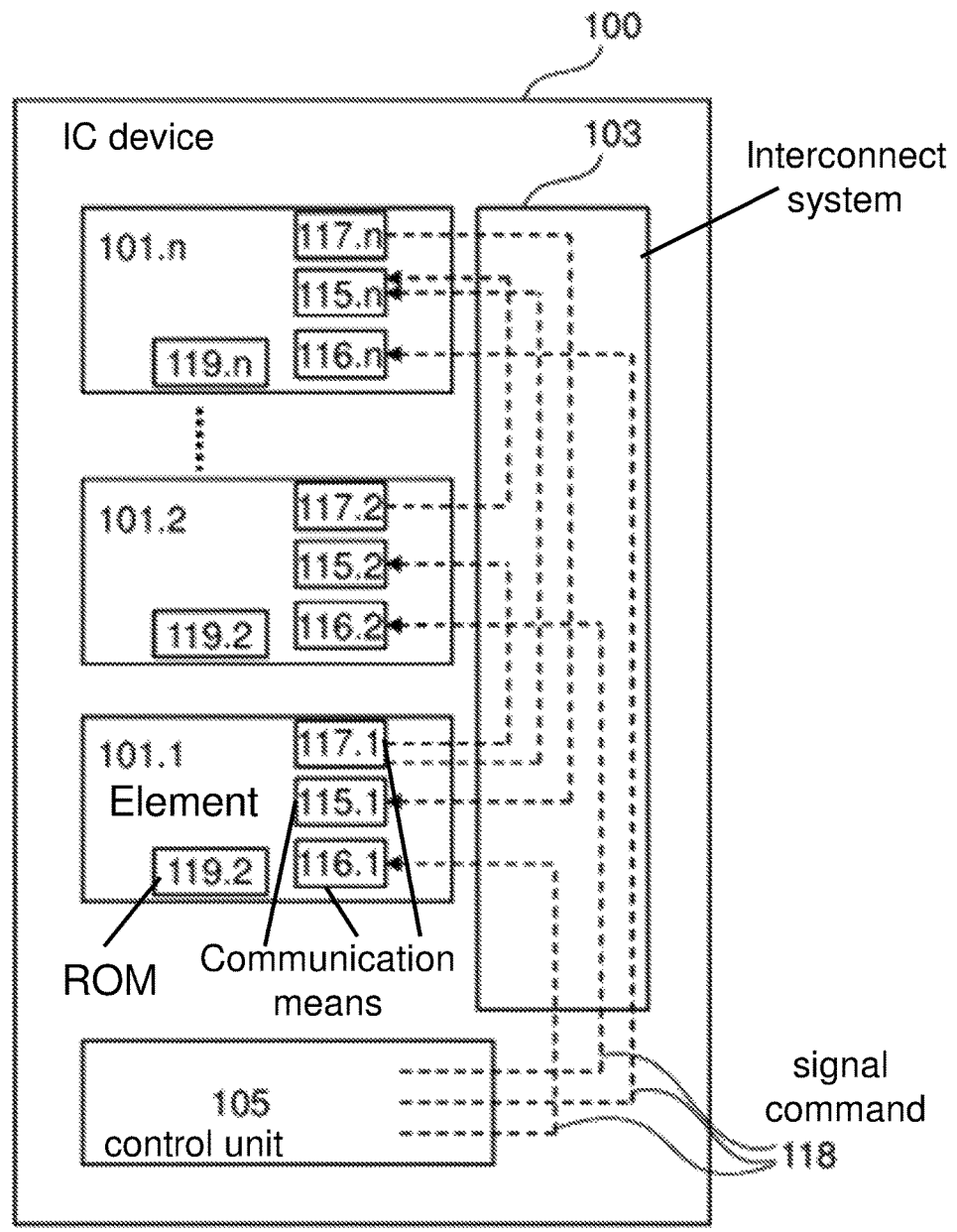
FIG. 1 shows the architecture of a part of an IC device in accordance with an example of the disclosed method.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The disclosed methods may provide an authenticated signing network between elements of an IC device, allowing the entire network of the elements to report in a predefined manner. This may increase the tamper resistance of a group of elements beyond that of a single element and/or may increase the tamper resistance of a single element using a group of elements.

The disclosed methods may allow tamper-response/indication on hardware deployed in distributed hardware systems such as the IC device. Examples of such systems may include blades, MCMs, servers deployed on DIMM modules and other small machines. These elements generally offer only limited physical device protection at a level far lower than physical protection on Hardware Security Modules (HSM's). The disclosed methods may enable combining limited device physical security with a network of elements logging active participation broadcasts in order to determine "loss of access" events.

Furthermore, the disclosed methods may provide an active proof of security, not simply the type of passive physical protection that hardware only solution afford. The proof of security resides in demonstrating access to an element's private signing key (e.g. attestation data). Elements may periodically sign messages that vouch for the presence of other elements. The result may be an authenticated message that an element has seen counterparty X at time T. The limited physical security in the element is assumed to delay any attacker that is attempting to compromise an element in situ, thus leading to vulnerability windows that are measured in human scale latencies (seconds and minutes) rather than milli- and microseconds. This may make it possible to detect an attack attempt within a window of vulnerability by tracing the last known-good responses (i.e. last received attestation data).

In one or more embodiments, modest physical security features may be used on distributed hardware systems as a higher overall security level may be inferred by assurances from multiple elements of the systems. This may be in the form of a "security heartbeat" provided by digitally signed messages between elements as a steady signature stream. The result may be a high-assurance chain of custody for trust on the assumption that active elements are not compromised while participating in stream.

The resulting compound effect on a network of such elements may be more secure than any one of the individual elements for the following reasons: elements individually may prove very little contribution compared to the overall contribution of all elements, especially when fully removed; other elements may monitor and log loss of heartbeat more precisely; network/signing or messaging flow can be configured to provide the highest coverage; networks of signatures can identify the loss of individual elements; many machines can be interleaved leaving very small windows of vulnerability; and networks consisting of many elements can arbitrarily reduce the window of vulnerability.

The distributed and securely interlocked reporting may provide a level of assurance against manipulation. The present scheme may add migration and cross-signing schedule planning to react to device losses in such a way that the tamper responses achievable through expensive secure hardware can be approximated.

According to one or more embodiments, the method further comprises configuring the given element to indicate the absence of one or more elements of the set of elements in case at least one of the received attestation data does not match the attestation pattern of the first communication plan or in case of not receiving by the given element attestation data in accordance with the first communication plan. This may enable the timely spotting any security issues that may relate to the absence of an element. This may also enable using the right communication plan that corresponds to the current configuration of the IC device (taking into account the absent or missing elements).

According to one or more embodiments, the configuring step is repeatedly performed. This may enable a continuous security monitoring of the IC device and may thus prevent unauthorized uses and/or access to the IC device.

According to one or more embodiments, the method further comprises in case of the absence of one or more elements of the set of elements, configuring in accordance with a second communication plan each element of the non-absent elements of the set of elements to perform steps a)-c) using the second communication plan instead of the first communication plan, the second communication plan spanning another time interval and comprising other attestation patterns. This may enable a reliable security monitoring method as it may use the adequate communication plan to monitor the IC device. For example, steps a)-c) and the step of indicating the absence of one or more elements may be repeated.

According to one or more embodiments, the method further comprises configuring each element of the non-absent elements to switch from the first communication plan to the second communication plan using data stored in the element indicative of the second communication plan. This may speed up the recovery process compared to the case where each element of the set of elements needs to be controlled via a control unit to switch into the second communication plan.

For example, each element of the non-absent elements may reconfigure the first communication plan when infrastructure/topology changes by generating or using pre-defined configurations, optimized for updated new topology. This may particularly be useful in case the elements have enough processing resources. In another example, the switch to the second communication plan may centrally be controlled by for example receiving at each element an indication of the second communication plan, e.g., in the form of a seed value as described below.

According to one or more embodiments, the second communication plan is dynamically generated in response to the determination of the absence of one or more elements of the set of elements. This may be useful as a predefinition of the communication plan may not cover all possible configurations or cases. This may thus avoid using an unsuitable communication plan and may thus increase the secure aspect of the disclosed methods.

According to one or more embodiments, the first communication plan is determined based on a sorting network. A communication plan that is defined in accordance with sorting networks may be an efficient sorting enumerate interconnect plan which may be suitable for propagating information in accordance with the disclosed methods.

According to one or more embodiments, the definition of the first communication plan comprising: dividing the time interval into time subintervals, wherein the given element receives attestation data from each of the other elements during a respective time subinterval of the time subintervals, and wherein during a time subinterval only N-2 elements of the set of elements receive attestation data. This may provide a time efficient planning of communication between the elements of the IC device which may enable a timely detection of security issues.

According to one or more embodiments, the method further comprises configuring the given element to receive the attestation data from one of the other elements during a respective time subinterval simultaneously with the reception of data by N-3 elements of the set of elements. This may further speed up the attestation of the disclosed methods and may improve the reaction time of the IC device to security issues.

According to one or more embodiments, the method further comprises ordering the time subintervals in a given order, wherein the determining that the received attestation data match the first communication plan comprises determining the ordering number M of the time subinterval during which the element has received the attestation data, and determining that the attestation data is attested by M elements of the set of elements. This may enable an accurate attestation process which may increase the secure aspect of the disclosed methods.

FIG. 1 shows the architecture of a part of an IC device in accordance with an example of the disclosed methods. The IC device 100 comprises a plurality of elements 101.1-101.n (collectively referred to by 101). An element of the plurality of elements 101.1-n may for example comprise a elementary processor, a PCIe card or a DIMM card. An element is used to denote a component of an IC design that is enabled with computational capability. The term "element" or "node" encompasses circuit elements comprising building blocks such as a PCIe card or DIMM card.

In order to ensure that each element 101 can communicate with other elements of the IC device 100, each element 101 comprises communication means 115.1-*n*-117.1-*n* (collectively referred to by 115 and 117) enabling the transfer of data via an interconnect system 103. The data exchange between elements 101 of the IC device 100 may concern any data present in the element 101. The element 101 may thus no longer operate independently of the other elements. This may particularly be useful when the contributions made by the elements are combined.

The elements 101 of the IC device 100 receive at their input means 115 instructions and/or data via the interconnect system 103. Each element 101 may deliver or output data to the interconnect system 103 via output means 117. For example each element 101.1 can communicate with another element 101.2 via the common interconnect system 103. This is the case, for example, when an element 101.1 needs to detect the presence of all other elements 101.2-*n*.

Each element 101 may communicate data (i.e. placing data on or receiving data from) via the interconnect system 103 using the input and output means 115 and 117. The communication of the data via the interconnect system 103 by element 101 may for example be automatically performed by the element 101 itself (e.g. by reading locally stored instructions).

In another example, the communication of the data via the interconnect system 103 by element 101 may be controlled by one or more control units 105 using control signals that are communicated to the elements via the interconnect system 103 or other instruction buses (not shown) of the IC device 100. The control unit 105 may activate only pairs of elements 101 that need to communicate at a time. This may for example be performed via an identification signal command 118 that is sent by the control unit 105 (e.g. via interconnect system 103 or an instruction bus of IC device 100) to the pairs of elements that need to communicate. This command 118 can act individually on each element using an identifier stored in an identification circuit 116 provided in each element 101 which receives the identification signal. The identification circuit 116 of an element 101 in response to receiving the identification signal may activate input or output means 115, 117 of the element 101. Upon being activated, input means 115 may enable, either selectively or collectively, the data placed on interconnect system 103 to be entered into the element 101. The output means 117 may place data or requests on interconnect system 103.

Although a single control unit 105 is shown, the set of elements 101 may be controlled by the same or different control units 105.

The identification circuits 116 of the elements 101 may permit the synchronous operation of at least a portion of the elements 101.

Each element 101 may further comprise a storage device, such as a read only memory ("ROM") 119.1-*n*. At least a portion of the ROM 119.1-*n* can include non-volatile data storage. At least a portion of the non-volatile data stored within the ROM 119.1-*n* can include data related to the element 101. For example, non-volatile port data stored within the ROM 119.1-*n* may identify the element 101 e.g. as a x16 PCIe card.

Each element 101 may be enabled with crypto-sufficient computational capabilities (e.g. each element 101 may comprise a processing unit or processor). Elements 101 may contain software that generates non-malleable chains of transaction/audit records as described below. The software when executed on each of the elements 101 may enable the element to interact with infrastructure notifications, follow and react to system notifications e.g. notifications announcing topology changes such as: bus-visible broadcasts announcing loss/appearance of new elements.

Figure 2:
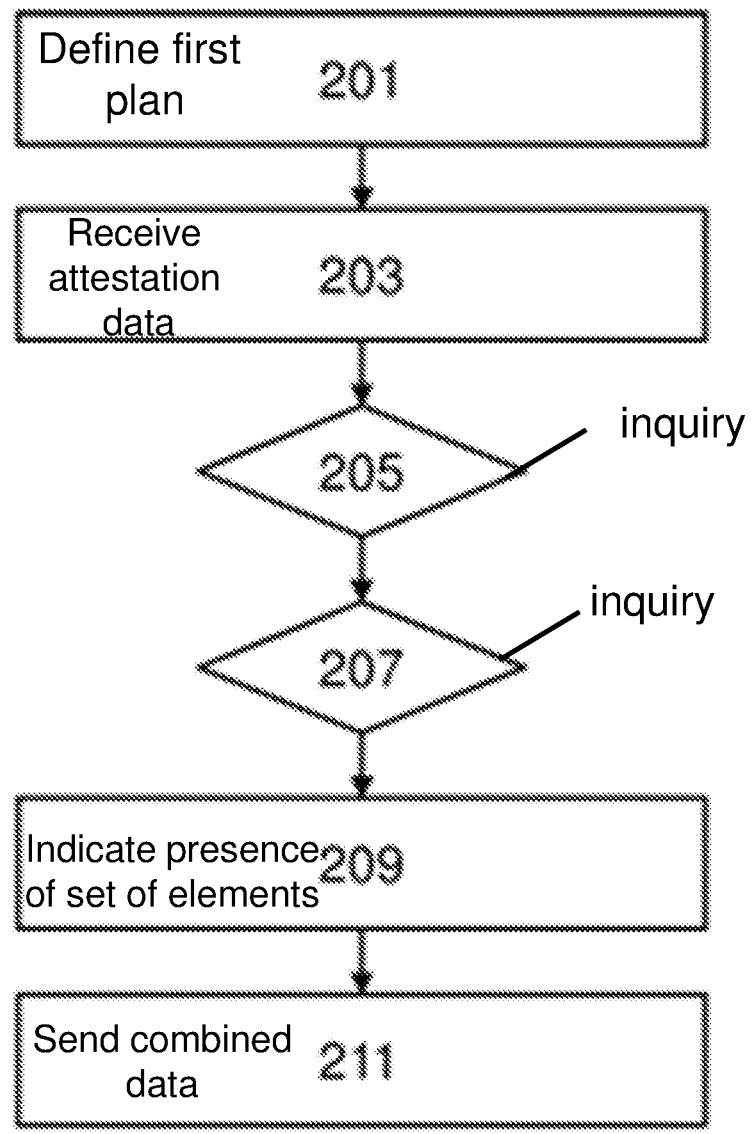
FIG. 2 is a flowchart of a method for secure operation of an IC device.

FIG. 2 is a flowchart of a method for secure operation of an IC device (e.g. IC device 100) having a set of N elements 101.

An element or node is used to denote a component of an IC design as described above. The set of elements of the IC device may communicate to each other via an interconnect system e.g. 103. The communication between the set of elements may be in guided (e.g. along a bus line) or unguided (e.g. broadcast to air) channels.

For example, the interconnect system may comprise a data bus that carries data between the set of elements e.g. in a bi-directional data flow.

In step 201, a first communication plan (or schedule or workflow) for pairwise communication of attestation data between all the set of elements through the interconnect system within a predefined time interval may be defined.

The first communication plan may define an attestation process where the set of elements are part of the attestation process. The attestation process may be a process of authenticating and attesting to the state of an element of the IC device. The purpose of attestation is to allow another element that receives the attestation data to obtain confidence in the identity and the presence of the sender element of the attestation data. The attestation process may require that each element of the set of element generates and/or signs an audit entry where the audit entry may be part (e.g. as an audit record) of the attestation data. Attesting attestation data may refer to the fact of logging one or more (signed) audit records in attestation data and send the attestation data to another element. The attesting may further comprise signing the attestation data to be sent in order that the receiver of the attestation data has access to the identity of the sender. The signature of the attestation data may for example be based on a public key cryptography method.

According to one or more embodiments, a communication plan such as the first communication plan may be defined using a set of environmental variables. The first communication plan may be determined or defined by setting the set of environment variables to respective values. For example, the first communication plan may be defined taking into account the topology of the IC device (e.g. distribution and/or number of the set of elements), expected/targeted security, and other policy-controlled settings. A policy may for example indicate "each element may be contacted by at least another one in at most N milliseconds". The definition of the first communication plan may also take into account or include expected system latencies and other environmental variables.

For example, the disclosed methods may provide sufficient spare bandwidth to tolerate peer-to-peer channels for signatures. In the first communication plan all elements 101 may be configured to attest at least once per N seconds. In this way, a steady, predictable and low-bandwidth flow of cross-signing traffic may be generated. All elements may be reachable through transitive attestation after M seconds. And, each element may have been contacted by at least another one in T<<M seconds.

An environment variable may for example comprise a configuration ID having a value indicating the configuration of the set of elements e.g. the number of elements in the IC device. In another example, the environment variable may comprise a time interval for each element of the set of elements indicating the time window during which the element may receive attestation data.

Other communication plans may also be defined in step 201 for other (expected) configurations of the IC devices, wherein each communication plan may be associated with respective values of the set of environment variables. For example, the first communication plan may be associated with a given configuration (e.g. a given configuration ID) of the set of elements and/or with a given latency.

The first communication plan may include attestation patterns. For example, the attestation patter may indicate the format of the attestation data to be received by each of the set of elements in accordance with the first communication plan. The attestation pattern may be defined based on the element that provides the attestation data and the time point (e.g. during the time interval) at which the attestation data is received or sent. For example, an attestation pattern may comprise one or more timestamps indicating the time the attestation data is signed and/or is received. The attestation pattern may further comprise one or more identifiers of the elements that signed the attestation data. The attestation pattern may further comprise at least part of the values of the set of environment variables of the first communication plan.

In one example, the first communication plan may be determined by coupling the set of elements by a sorting network. This may speed up the attestation process.

In another example (cf. FIG. 3), the first communication plan may be defined or determined by: dividing the time interval into time subintervals; such that N−1 elements receive attestation data during a single time subinterval and that each element of the N elements would receive during the time interval attestation data from each other element of the N−1 elements. In one example, the data may be received simultaneously during each of the subintervals.

The first communication plan may be determined offline e.g. before being integrated in the IC device. The first communication plan may be defined such that its policies balance resources and security (such as response latency).

The first communication plan may be defined so as to minimize propagation latency with reasonable resource use.

Each element of the set of elements may comprise the one or more communication plans (e.g. the first communication plan) as determined in step 201 and may function in accordance with each of the communication plans. The selection of one of the communication plans may for example be performed automatically based on (current) values of the set of environmental variables. In another example, each element of the set of elements may receive a control signal indicating the communication plan to be used. The control signal may be received from control unit 105. For example, the ROM 119 may store e.g. in the non-volatile data storage the communication plans e.g. in the form of instructions.

Each element of the set of N elements may be configured according to the first communication plan such that the configuring of a given element of the set of elements may comprise steps 203-211. The configuring of the set of N elements to perform steps 203-211 may automatically performed by each element of the set of elements. In another example, the configuring of the set of elements in accordance with steps 203-211 may be controlled by control unit 105.

The first communication plan may for example automatically be used by the set of N elements e.g. based on the current configuration of the IC device. For example, if an element of the IC device is removed or is missing then the set of elements may automatically be informed accordingly and each element of the remaining elements of the IC device may automatically switch to the first communication plan that corresponds to the new or current configuration of the IC device. For that, algorithms which may be independently enumerated on different elements may be used such as to perform or indicate "action: switch to communication plan with seed S for element X out of N". For example, after configuration change events such as element loss or removal may be logged e.g. together with audit records to bind to attestation.

In step 203, the given element may receive attestation data of each other element of the set of elements. For example, the reception step 203 may span a predefined time period. In another example, the reception of the attestation data by the given element from each element of the other N−1 elements may be during a time subinterval assigned to the each element (i.e. the reception of the attestation data by the given element may be performed during N−1 time subintervals). At least part of the N−1 time subintervals may be consecutive in time.

The given element may automatically receive the attestation data. In another example, the given element may receive the attestation data from another element in response to sending a request for such attestation data to the other element.

An element A of the set of elements may generate the attestation data by for example signing an audit entry to be sent to the receiver element B as and log the audit record of the signed audit entry in the attestation data. In addition, in case element A has previously received attestation data (in accordance with the first communication plan) from another element X, the element A may log audit records for both the received one or more audit entries and the signed entry by element A and write them in the attestation data e.g. in chronological order to keep traces of elements' activities and to keep track of any changes made to the attestation process. This may provide a chain of audit records (that is comprised in the attestation data). The chain of audit records may be built as a non-malleable chain—i.e., an audit record which may not be modified once entries are issued. For example, hash chains or other constructs based on cryptographically secure hash functions, may be used.

Upon receiving attestation data from another element, the given element may determine in inquiry 205 whether the received attestation data matches an attestation pattern as defined in the first communication plan. Inquiry 205 may individually be performed for every received attestation data by the given element from another element. For example, the given element may compare the chain of the audit records with the chain of records as defined in the attestation patterns of the first communication plan. For example, if the given element is expected (in the first communication plan) to receive an attestation data at t1 from an element A, where element A is expected to receive attestation data at t0 from another element X, the given element has to check whether there are two audit records in the received attestation data that are chained such that the first audit record in the chain is assigned to element X and the second audit record in the chain is assigned to element A.

In case the received attestation data matches the first communication plan, the given element may determine in inquiry 207 whether the received attestation data is attested by N−1 elements of the set of elements e.g. the given element may determine that N−1 audit records are logged or saved in the received attestation data.

The verifications in inquiries 205-207 may be performed by the given element. In another example, inquiries 205-207 may comprise sending the received attestation data e.g. to the control unit 105 such that the control unit may perform the checks of the inquiries and returns the results to at least the given node. For example, the control unit may determine whether the attestation data matches the first communication plan and may determine whether the attestation data is attested by N−1 elements and an indication of the results of the two checks may be indicated in a response to at least the given element.

In other words, audit chains (attestation data) can be exported and stored for external verification. Verification is achieved through the reconstruction of the signatures' flow timeline. Elements can report their longest time window without cross-attestation from other elements. Counterparties can verify the signatures of other elements in logs. The interpretation of latency and verification is a policy question and applied during the verification process. Immediate key rollover may be initiated when elements disappear and the rest of compound-tamper group (i.e. the rest of the set of elements) may notice and react to the lack of responses.

And in case the attestation data is attested by N−1 elements of the set of elements, the given element may indicate in step 209 the presence of the set of elements before the time interval has lapsed.

In case the attestation data is attested by less than N−1 elements, the given element may combine (e.g. to form a chain of audit records as described above) the received attestation data with data attested by the given element and may send in step 211 the combined data as the attestation data to a further element of the set of elements.

Using the above example, the attestation data may indicate one or more pairwise communications. Element B received attestation data from element A. This defines a two pairwise communications, one pairwise communication between X and A and another pairwise communication between A and B. If element B combines or aggregates the attestation data received from A with its own attestation data and the aggregated attestation data is sent to an element C, this defines a third pairwise communication between B and C which has an indication of the first and second pairwise communications i.e. element C has access to attestation data signed by X, A and attestation data signed by B. In other words, this may enable pairwise communications to be aggregated, building transitive trust relationships and providing aggregate security.

Signatures or attestation data may be aggregated into a non-malleable, trustworthy public log such as large hash chain-based high-assurance systems. This may especially be useful if distributed elements are under different administrative controllers that do not collude.

In case (inquiry 205) the received attestation data does not match an attestation pattern as defined in the first communication plan, or the given element does not receive attestation data from another element as expected by the first communication plan, the method steps 201-211 may be repeated using a second communication plan. This may be an indication that one or more elements of the N elements of the IC device 100 are absents or missing. The repeating of the steps 201-211 may start after the time interval is elapsed such that all missing elements can be detected. For example, if at a first time subinterval an element F is determined as being absent because it does not send the attestation data at time as expected within the first communication plan. However, it may be that at a later time subinterval another element E may be determined as absent. Therefore it may be beneficial for waiting until a full list of absent elements may be determined. Thus, the second communication plan to be used instead of the first communication plan may accurately be chosen. In one or more embodiments of the disclosed methods, the full list of the absent elements may be determined before the end of the time interval defined by the first communication plan because of the usage of the chained information between the elements of the IC device.

The second communication plan may be associated with the new configuration (i.e. with detected missing elements) and may span a different time interval and have different attestation patterns compared to the first communication plans. The non-absent elements may automatically switch to the second communication plan upon knowing (e.g. by receiving notifications) the absence of one or more elements of the IC device. In another example, the non-absent elements may be controlled by the control unit 105 to switch to the second communication plan e.g. by sending signal commands to each of the non-absent elements.

Figure 3:
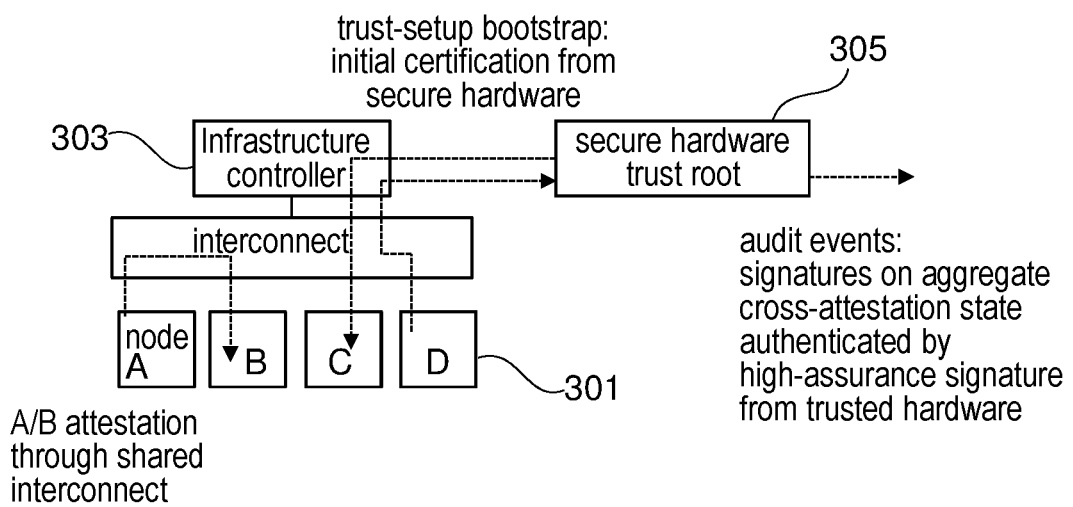
FIG. 3 shows a simplified example in accordance with the disclosed method.
Figure 3:
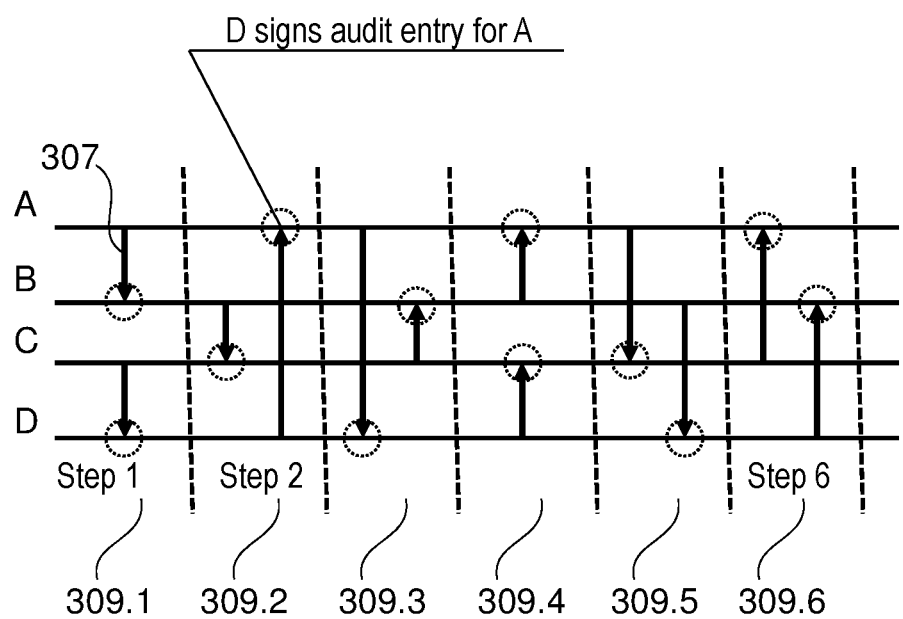

FIG. 3 shows a simplified example in accordance with the disclosed methods. In the present example, an IC device of four nodes or elements A, B, C and D is described, where arrow A→B 307 indicates element A signing an audit entry for element B. These entries may be used by B to demonstrate it was reachable from A at the given time. Time is quantized into discrete steps, which may be generally human-scaled times, therefore much slower than typical communications-system frequencies. The IC device of the present example may comprise DIMM-mounted nodes that form a locally connected network on a single backplane. The infrastructure controller 303 (such as control unit 105) may be responsible for interconnect etc. connectivity and setup, but is not involved in actual cross-attestation flows.

Individual elements A-D communicate through (an untrusted), shared interconnect 301, issuing audit entries for each other, optionally receiving an initial certificate from accessible secure hardware 305. The initial certificate is used to exchange attestation data by the element. When necessary, the same secure hardware 305 may sign aggregate states of the attestation network, creating secure checkpoints to allow efficient auditing by limiting temporal scope, even for long-running systems where an audit hash-chain may grow effectively unbounded.

FIG. 3 illustrates a sample cross-attestation schedule (e.g. the first communication plan) that is defined by the following properties. A periodic schedule of six steps 309.1-6 may be repeated e.g. infinitely. Exactly two pairs of elements communicate in each step 309.1-6, setting a fixed upper bound on the steady communication and signing load. All element pairs communicate, in both directions, within each full six-step period.

The schedule may allow efficient chaining of attestation pairs. As an example, if the B→C attestation in step 2 includes some information about attestation of A→B in the preceding step 1, the result may transitively include history. This may allow each element to discover system configuration entirely passively, just through monitoring attestation entries targeted to it.

All elements get vouched for by at least one other element in every three-step window. This allows to easily scale step latencies to human-observable times: even a very low 30 Hz step frequency would ensure attestation at least once every few hundred milliseconds for each element-comfortably within physical intrusion-detection latencies.

Steps are clearly separated by periods where cross-attestation flows are quested. In one example stable snapshots may be taken, when needed for archival or to timestamp state for audit purposes.

The present example describes small number of elements; however, similar static schemes or communication plans may be optimally pre-generated for expected configurations.

Since the schedules may be efficiently represented, even small distributed systems would be expected to store many precomputed configurations, and settle on one of those. A central repository, such as a hosting server with no practical resource limits, could store optimized schedules and distribute to elements as appropriate. In practice, similarly formulated optimization problems of considerable complexity may be represented and solved efficiently online, even in the absence of precomputed schedules.

Larger systems may employ graph-generation algorithms to construct communication networks or plans with similar properties described above. As an example, sorting networks may be used. Comparisons required to sort efficiently also tend to form a dense layout of pairwise connections which may be beneficial for design goals. High-performance computing systems employ similar techniques to construct interconnection graphs for very large systems, then assist distributed nodes by broadcasting subsets relevant to them a method which may be easily adapted to our system.

Figure 4:
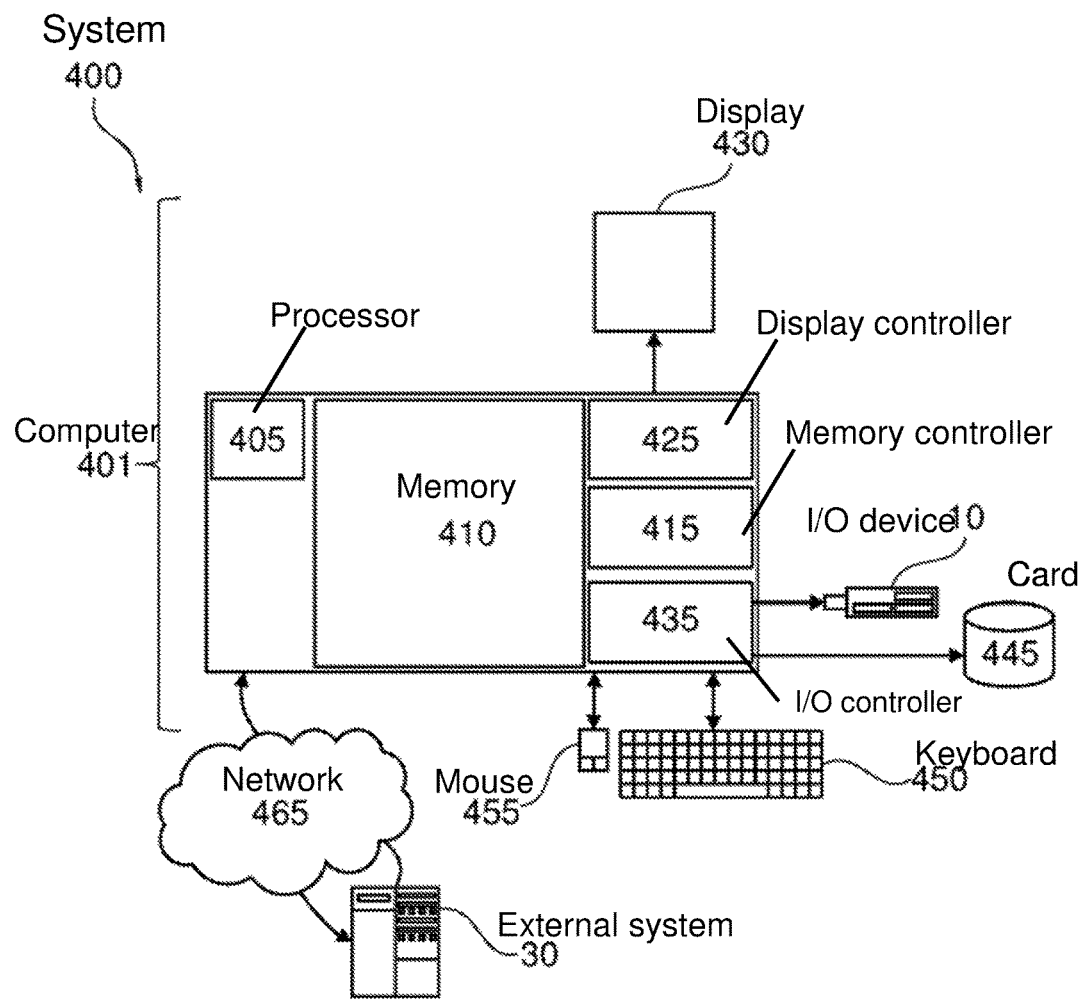
FIG. 4 represents a computerized system, suited for implementing one or more method steps as involved in one or more embodiments of the present disclosure.

FIG. 4 represents a general computerized system 400, suited for implementing method steps as involved in the disclosure. The system 400 may comprise the IC device 100 as described above.

In exemplary embodiments, in terms of hardware architecture, as shown in FIG. 4, the computer 401 includes a processor 405, memory 410 coupled to a memory controller 415, and one or more input and/or output (I/O) devices (or peripherals) 10, 445 that are communicatively coupled via a local input/output controller 435. The input/output controller 435 can be, but is not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 445 may generally include any generalized cryptographic card or smart card known in the art.

The processor 405 is a hardware device for executing software, particularly that stored in memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing software instructions.

The memory 410 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 410 can have a distributed architecture, where various components are situated remote from one another, but can be accessed by the processor 405.

In exemplary embodiments, a conventional keyboard 450 and mouse 455 can be coupled to the input/output controller 435. Other output devices such as the I/O devices 445 may include input devices, for example but not limited to a printer, a scanner, microphone, and the like. Finally, the I/O devices 10, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 445 can be any generalized cryptographic card or smart card known in the art. The system 100 can further include a display controller 425 coupled to a display 430. In exemplary embodiments, the system 400 can further include a network interface for coupling to a network 465. The network 465 can be an IP-based network for communication between the computer 401 and any external server, client and the like via a broadband connection. The network 465 transmits and receives data between the computer 401 and external systems 30, which can be involved to perform part or all of the steps of the methods discussed herein. In exemplary embodiments, network 465 can be a managed IP network administered by a service provider. The network 165 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

The computer 401 may be a PC, workstation, intelligent device or the like. When the computer 401 is in operation, the processor 405 is configured to execute software stored within the memory 410, to communicate data to and from the memory 410, and to generally control operations of the computer 401 pursuant to the software.

In the following description, further examples will be described.

The signing traffic requires human-scale latencies between elements which are many orders of magnitude below that of local interconnect latencies.

The resulting compound of elements (e.g. 101) may become more secure than any of its constituent elements. Individual elements may prove very little by themselves, especially when fully removed. Other elements may monitor and log loss of heartbeat more precisely. Signatures may be aggregated into a non-malleable, trustworthy public log. This is especially useful if distributed elements are under different administrative control and one can assume that different administrators do not collude.

The hosting environment (i.e. elements 101) may always be available since most commodity hardware lacks long-lasting battery-backed memory. In the same manner, secure attestation may require some volatile, protected memory.

Elements, when present (e.g. not removed), may be active and therefore auditable. This is typical in both commodity and high-end distributed systems (clouds and virtual environments) where elements are used to consolidate workloads, and generally have a high availability. Power down and power loss events may be bridged over in staged approach is used.

High-assurance security systems require physical protection beyond that of commodity PCs. Dedicated, 'secure hardware' is fundamental, to provide high assurance roots of trust. The level of assurance is standardized according to the FIPS Standard 140-2. The standard specifies 4 levels of assurance, with level 4 being the highest.

Commercially used systems target "absolute security" which corresponds to FIPS 140-2, Level 4. However this may often be impractical. Physical security is expressed as resistance to an attacker measured in time. For example a UL "TRTL-30X6" document safe is assumed to survive 30 minutes of attack. There may no be physical devices or elements that have infinite resistance as this is considered infeasible. The FIPS 140-2 Level 4 assurance sets limit and may be open to interpretation. The next-lowest FIPS 149-2 level, Level 3, may have limited applicability since it depends on 'visually observable' tamper evidence. This obviously has limited applicability for mobile/remote counterparties. Thus for remote devices, only active/electronic attestation proof suffices.

Chip and microelectronic technology has moved beyond the FIPS 140-2 scope and the gap between FIPS 140-2 Level 3 and FIPS 140-2 Level 4 may be perceived as a design problem. The present system may for example have a level between Level 3 and Level 4. Individually, one may inherit Level 3 assurance from elements and audit events from distributed network attest for vulnerability windows.

Physical protection combines local and group-wide protection. This is important since FIPS 140 Level 4 may not be suitable on a DIMM form factor.

FIPS 140 Level 3 assumed possible—(visually confirmed) tamper evidence. Level 3 is used since Level 3/4 gap is too large to be practical and the present multi-server instance may add real value to this.

A "secure module" requires local code storage, on-server, potentially, only trusted-boot bootstrap code. Prism ROM bootstrap needs less than <8 KB ROM code and externally supplied code is chain-verified as it enters module. A prerequisite of any certification is that it must start with known-good code.

Microservers may need battery-backed (BB) storage on-board for security use. Unlike HSMs, bridging short times is sufficient, long-term shelf life is not. One may procedurally increase usability through redundancy, which is different than HSMs in which everything must be locally provided.

A multi-server deployment may live with short bridging times may utilize save/restore between multiple servers (save, replace battery, restore). This has no (immediate) relevance to existing certifications and may become useful if multi-server setups are recognized as useful.

An alternative is externally provided batteries. i.e., battery DIMMs that are inserted into a microserver grouping and supplies others. HSMs similarly rely on external power, this may be just an extreme instance.

The goal may be to balance bandwidth/CPU load and coverage. For that following options may be used.

Option 1: Using algorithms that allow parallel reconstruction, without coordination by broadcasting to the elements or devices the following action: "switch to communication plan with seed S for device X out of N". Using this action, no coordination is needed between the elements as the received seed value may be used by each element to determine or define the communication plan.

In the above option, the lack of coordination allows scaling to arbitrary node counts.

Option 2: Using pre-computed or procedurally enumerated interconnection plans (or communication plans) as follows: select/enumerate communication plans after configuration changes; communication plans may be compressed considerably (e.g. offline construction is feasible); procedural enumeration may be used for arbitrary network (of elements) size (e.g. constructive interconnect generation is runtime-solvable).

Communication plans defined based on bitonic sorting networks' may particularly be suitable for the following reasons: sorting networks may define data-independent, fixed interconnection plans; sort networks may be used to define plans of pairwise comparisons across fixed node set; therefore, possible to precompute or offline-enumerate and optimize; pairwise comparisons may be used for cross-attestation messages; comparisons in fast sorting algorithms "propagate" connectivity quickly i.e., transitive connectivity expands very fast even in a few rounds; the present system may benefit from fast transitive reachability which allows any node or element to be attested by many in a short time.

Optimal sorting networks may be suitable for small N number of elements. It may be sufficient, depending on a priori known system-scaling limits. And hierarchical decomposition may be possible (e.g. sorting networks are self-similar).

Sorting network construction may accommodate resource constraints such as: restricted number of simultaneously performed comparisons. In this case, balance assurance, request timings, and service overhead may be taken into account for the definition of the communication plans using the interconnect density (e.g. how often must each element be contacted) and the overhead (e.g. how much computation/bandwidth may be dedicated to traffic).

The monitoring and reaction to system reconfiguration broadcasts may be performed by, for example, rolling call and reconfiguration after unexpected loss of elements; flooding newly introduced elements to include in system-wide audit flow and preannouncing planned topology changes, such as planned element removal.

The environment is powered up, or at least protected (this may be true for high-end servers, or many industrial (rack-mount) systems). And there may be no need for local battery-backed (BB) memory or at least reduce bridging requirement (i.e., not months). This may assume to bootstrap trust from local, Level 4 hardware, if needed, i.e., Level 4 hardware can provide attestation for local compound.

Microservers can export state and restore from BB Level 4 storage. Freshness, explicit save/restore vs. centrally pushed secrets may be used. And the system-level activity, may not contribute in per-device audit/certification.

In this example, interleaved, chained timestamp logs between multiple microservers may be used. The removal of any single element will be noted by compound (e.g. by control unit 105). And, elements' keys may be revoked by group if it notices removal.

In this example, steady, low-priority, low-bandwidth background traffic may be generated and low-latency connections, may be used if available. And a configurable grace period may be used i.e. touch each element at least once every N seconds (which can be aggregated: parallel graph-traversal problem).

In this example, an optimization problem may be used according to which schedule interleaving timestamp chains may be dynamic, adapted to element count. It may also incorporate physical location (if latency-visible). The reconfiguration may be tied to reconfiguration events (udev-like async notify)

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method for secure operation of an IC device having a set of N elements, the method comprising:
providing, using a processor system, an interconnect system for enabling communication between the set of elements;
defining, using the processor system, a first communication plan for pairwise communication of attestation data between all the set of elements through the interconnect system within a predefined time interval;

configuring in accordance with the first communication plan each element of the set of elements, the configuring for a given element of the set of elements comprising at the given element performing the following operations:
 a) receiving attestation data of each other element of the set of elements;
 b) determining whether each of the received attestation data from the other elements match an attestation pattern as defined in the first communication plan; and
 c) in case the received attestation data matches the attestation pattern as defined in the first communication plan determining whether the received attestation data is attested by N−1 elements of the set of elements;

in case the received attestation data is attested by N−1 elements of the set of elements, indicating a presence of the set of elements before the time interval has lapsed, otherwise combining the received attestation data with data attested by the given element and sending the combined data to a further element of the set of elements.

2. The method of claim 1, further comprising configuring the given element to indicate an absence of one or more elements of the set of elements in case at least one of the received attestation data does not match the attestation pattern of the first communication plan or in case of not receiving attestation data in accordance with the first communication plan.

3. The method of claim 1, the configuring step being repeatedly performed.

4. The method of claim 2, further comprising in case of the absence of one or more elements of the set of elements, configuring in accordance with a second communication plan each element of non-absent elements of the set of elements to perform operations a)-c) using the second communication plan instead of the first communication plan, the second communication plan spanning another time interval and comprising other attestation patterns.

5. The method of claim 4, further comprising: configuring each element of the non-absent elements to switch from the first communication plan to the second communication plan using data stored in each respective element of the non-absent elements indicative of the second communication plan.

6. The method of claim 4, wherein the second communication plan is dynamically generated in response to a determination of the absence of one or more elements of the set of elements.

7. The method of claim 1, the first communication plan being determined based on a sorting network.

8. The method of claim 1, the definition of the first communication plan comprising: dividing the time interval into time subintervals, the given element receiving attestation data from each of the other elements during a respective time subinterval of the time subintervals, wherein during a time subinterval only N−2 elements of the set of elements receive attestation data.

9. The method of claim 8, further comprising configuring the given element to receive attestation data from one of the other elements during a respective time subinterval simultaneously with reception of data by N−3 elements of the set of elements.

10. The method of claim 8, further comprising ordering the time subintervals in a given order, wherein the determining that the received attestation data matches the attestation pattern as defined in the first communication plan comprises determining an ordering number M of a time subinterval during which an element has received attestation data, and determining that attestation data is attested by M elements of the set of elements.

11. An IC device comprising a set of N elements, and an interconnect system for enabling communication between the set of elements, wherein each element of the set of elements is configured in accordance with a first communication plan to perform the following operations:
 a) receive attestation data of each other element of the set of elements;
 b) determine whether each of the received attestation data from the other elements match an attestation pattern as defined in the first communication plan;
 c) in case the received attestation data matches the attestation pattern as defined in the first communication plan determine whether the received attestation data is attested by N−1 elements of the set of elements;

in case the received attestation data is attested by N−1 elements of the set of elements, indicate a presence of the set of elements before a time interval has lapsed, otherwise combine the received attestation data with data attested by a given element and send the combined data to a further element of the set of elements.

12. The IC device of claim 11, wherein the IC device is incorporated within a computer system.

* * * * *